United States Patent Office.

RENÉ CHARLES DEMOLON AND GEORGE ALEXANDER CHAS. THURNEYSSEN, OF PARIS, FRANCE.

IMPROVEMENT IN TREATING FISH FOR MANURE AND OIL.

Specification forming part of Letters Patent No. 12,480, dated March 6, 1855.

*To all whom it may concern:*

Be it known that we, RENÉ CHARLES DEMOLON and GEORGE ALEXANDER CHARLES THURNEYSSEN, of the city of Paris, in the Empire of France, have invented a new Manure or Substitute for Guano, for which Letters Patent were granted to us by the French government on the 13th day of January, 1851; and we hereby declare that the following is a full and exact description thereof.

The nature of our invention consists in preparing and reducing fish or remains of fish to a powder, which will not deteriorate by keeping, which can be easily transported and readily applied as manure.

Before we proceed with the description of our process of making the fish powder or guano, we will briefly investigate what constitutes the fertilizing power and qualities of Peruvian guano.

Elaborate analyses of the best guano from the Pacific ocean have shown that this powerful manure is composed of remains of sea-animals, principally fish, and some remains of birds mixed with the excrement of birds which feed on sea-animals. Large layers of these remains and excrements are gradually formed, and each layer is thoroughly and perfectly well dried from the influence of an uninterrupted hot sun in a latitude where rains are almost unknown.

Chemistry has demonstrated that the flesh of land-animals contains in dry state 17.17 per cent. of ammonia; dry blood, 18.95 per cent.; but dry cod-fish, 22.60 per cent., and the bones of fish 70 per cent., of phosphate of lime. This shows that the flesh and bones of fish contain the largest amount of ammonia and phosphate of lime, which possess the greatest fertilizing properties. The powerful action of guano as manure is therefore principally due to the remains of fish, of which it is mostly composed.

As nature has placed at our disposal at all points of the globe inexhaustible sources of this fertilizing agent, we were led to this invention, which enables us to produce the best kind of guano in any northern or southern latitude and climate, and at a cheaper rate than the guano from the Pacific islands can be furnished.

To enable others to make and use our invention, we will proceed to describe the *modus operandi.*

To obtain from fish a dry powder which will not be altered by the influence of the atmosphere or by long keeping, the fish or remains of it must be freed from the oil which is peculiar to all species of fish, and of which they contain a more or less quantity. The oil is the main obstacle in perfecting a thorough desiccation of the flesh of fish, and this oil is also prejudicial to vegetation. For that purpose we submitted the fish in its raw state as it comes from the water to a powerful pressure; but we found that it is difficult to extract the oil from it, and the powder made from fish pressed in a raw state does not get dry and is very liable to decomposition. To obviate these difficulties we instituted various experiments, and we found and adopted the following mode as being the cheapest and most expedient. We place the raw fish in a boiler, which we heat by means of steam. No water is added, so that the gelatine and all soluble parts are retained in the fish. When the fish has been thus sufficiently boiled it is removed from the boiler and put into a press, where sufficient power is applied to extract the oil from it. The oil flows very readily from the fish under pressure, as the process of boiling opens the cellular tissues of the fish and gives an easy egress to the oil. The fish thus compressed and freed from oil is brought under the action of grating machinery similar to that employed in the beet-sugar manufacture. The fish are torn and divided by it into small particles, which are placed upon hurdles or other suitable fixtures, and so exposed to a current of hot air, for which a drying-chamber or other convenient contrivances may be used. The heat can be raised from 212° to 250° Fahrenheit without injury to the article under desiccation. When the grated fish has been thoroughly dried the particles are then still more reduced by means of millstones or other suitable grinding or crushing apparatus, and the powder thus obtained is ready for use. This powder being free from oil and moisture, it keeps perfectly well without undergoing any alteration, without emitting any unpleasant odor It can be easily transported and mixed readily with grain for sowing either broadcast or by means of sowing-machines. It has not the least injurious influence upon the health of persons handling it.

The fish powder or guano which we produce, and of which we annex a specimen, has been repeatedly examined and analyzed, and the following result proves it to be richer on ammonia and other fertilizing agents than the best Peruvian guano.

Analysis of our newly-invented fish powder:

| | |
|---|---:|
| Water | 1.00 |
| Organic matter of azotic nature | 72.00 |
| Salts, consisting principally of chloride of sodium | 4.20 |
| Carbonate of ammonia and traces of sulphate, phosphate, and magnesia of lime | 22.50 |
| Carbonate of lime | .06 |
| Silica | .02 |
| Magnesia and loss | .22 |
| | 100.00 |

Ammonia, 14.45 per cent.

Fish may also be treated by means of acids, whereby the flesh is preserved and prevented from decomposition, and when dried and divided into small particles it may be employed for manure; but this process is costly and very imperfect. The most practical, most efficient, and most economical mode of treating fish for that purpose is boiling, pressing, grating, desiccating, and pulverizing, as above described.

What we claim as our invention, and desire to secure by Letters Patent, is—

The reduction of fish, or the remains of fish, to a dry powder for manure or other purposes, substantially as specified.

Paris, the 28th December, 1854.

DEMOLON.
    CHS. THURNEYSSEN.

Witnesses:
 CHS. L. FLEISCHMANN,
 F. WERMUTH.